United States Patent
Ichikawa

(10) Patent No.: US 10,453,625 B2
(45) Date of Patent: Oct. 22, 2019

(54) SWITCH ATTACHMENT MEMBER

(71) Applicant: WORKS BELL INC., Setagaya-ku (JP)

(72) Inventor: Yasuaki Ichikawa, Chino (JP)

(73) Assignee: WORKS BELL INC., Setagaya-ku (JP)

( * ) Notice: Subject to any disclaimer, the term of this patent is extended or adjusted under 35 U.S.C. 154(b) by 0 days.

(21) Appl. No.: 15/935,718

(22) Filed: Mar. 26, 2018

(65) Prior Publication Data

US 2019/0139718 A1 May 9, 2019

(30) Foreign Application Priority Data

Nov. 8, 2017 (JP) ................................. 2017-215685

(51) Int. Cl.
*H01H 9/02* (2006.01)
*B62D 1/04* (2006.01)

(52) U.S. Cl.
CPC .......... *H01H 9/0207* (2013.01); *B62D 1/046* (2013.01); *H01H 2223/018* (2013.01); *H01H 2223/024* (2013.01); *H01H 2223/05* (2013.01); *H01H 2231/026* (2013.01)

(58) Field of Classification Search
CPC .......... H01H 9/0207; H01H 2223/018; H01H 2223/024; H01H 2223/05; H01H 2231/026; H01H 2021/225; B62D 1/046; B60K 20/06; B60Q 1/0082

USPC ................................. 200/61.54, 61.55–61.57
See application file for complete search history.

(56) References Cited

U.S. PATENT DOCUMENTS

| | | | | |
|---|---|---|---|---|
| 4,598,603 A * | 7/1986 | Hiramitsu | .............. | B60K 35/00 200/61.54 |
| 6,586,692 B2 * | 7/2003 | Agetsuma | .............. | B60K 20/06 200/61.54 |
| 8,067,709 B2 * | 11/2011 | Han | ....................... | B62D 1/046 200/336 |
| 8,173,917 B2 * | 5/2012 | Rosman | ................. | B60K 20/06 200/61.88 |
| 8,193,460 B2 * | 6/2012 | Braun | .................... | B60Q 5/003 200/61.54 |
| 8,546,707 B2 * | 10/2013 | Yorino | ................. | H01H 13/705 200/5 A |
| 8,658,922 B2 * | 2/2014 | Shellabarger | .......... | B60Q 5/003 200/61.55 |

FOREIGN PATENT DOCUMENTS

JP        6-239243        8/1994

* cited by examiner

*Primary Examiner* — Edwin A. Leon
(74) *Attorney, Agent, or Firm* — Oblon, McClelland, Maier & Neustadt, L.L.P.

(57) ABSTRACT

According to an embodiment, a switch attachment member includes a support that is formed to be attachable between a steering wheel and a steering boss, and supports a switch. The support is formed to be capable of changing a position of the switch.

7 Claims, 5 Drawing Sheets

SWITCH ATTACHMENT MEMBER

CROSS-REFERENCE TO RELATED APPLICATION

This application is based upon and claims the benefit of priority from Japanese Patent Application No. 2017-215685, filed on Nov. 8, 2017; the entire contents of which are incorporated herein by reference.

FIELD

The present invention relates to a switch attachment member.

BACKGROUND

A genuine steering wheel (standard specification) that is mounted on a vehicle or the like is replaced with another steering wheel (other than the standard specification) other than the genuine steering wheel as necessary for user preferences or the like in some cases. When the genuine steering wheel is replaced with the other steering wheel, a switch (for example, an operating switch of a stereo system, an air conditioner, a car navigation system, or the like) that is mounted on the genuine steering wheel is also detached along with the genuine steering wheel. This degrades user convenience. Hence, even in a case of using the other steering wheel, it is desirable to be able to reuse the switch that is mounted on the genuine steering wheel.

DETAILED DESCRIPTION

According to an embodiment, a switch attachment member includes a support that is formed to be attachable between a steering wheel and a steering boss, and supports a switch. The support is formed to be capable of changing a position of the switch.

According to another embodiment, in the switch attachment member, the support includes a first support plate that supports the switch, and a second support plate that is formed to be attached between the steering wheel and the steering boss, and supports the first support plate in a movable manner.

According to still another embodiment, in the switch attachment member, the first support plate is rotatably provided on the second support plate with a first end portion of the first support plate as a rotation center, and a second end portion on a side opposite to the first end portion is formed to be fixable to the second support plate.

According to still another embodiment, in the switch attachment member, the second support plate is provided with a through-hole through which wiring connected to the switch passes.

First Embodiment

The first embodiment is described with reference to FIGS. 1 to 10 (mainly, FIGS. 1 to 5).

Basic Configuration

Figure 1:
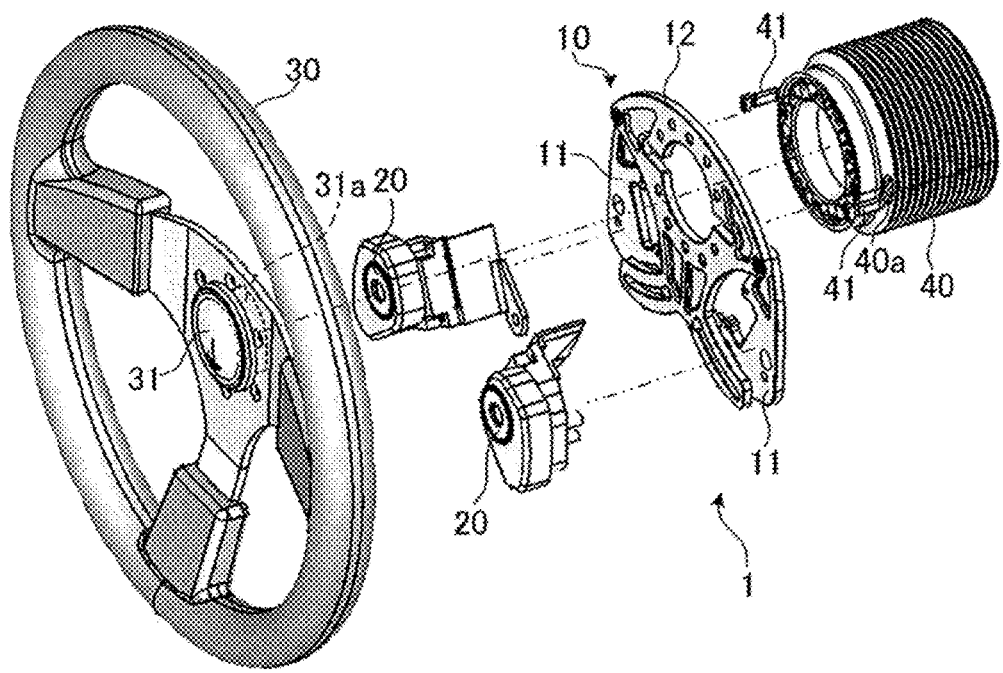
FIG. 1 is an exploded perspective view illustrating a state of using a switch attachment member according to a first embodiment.
Figure 2:
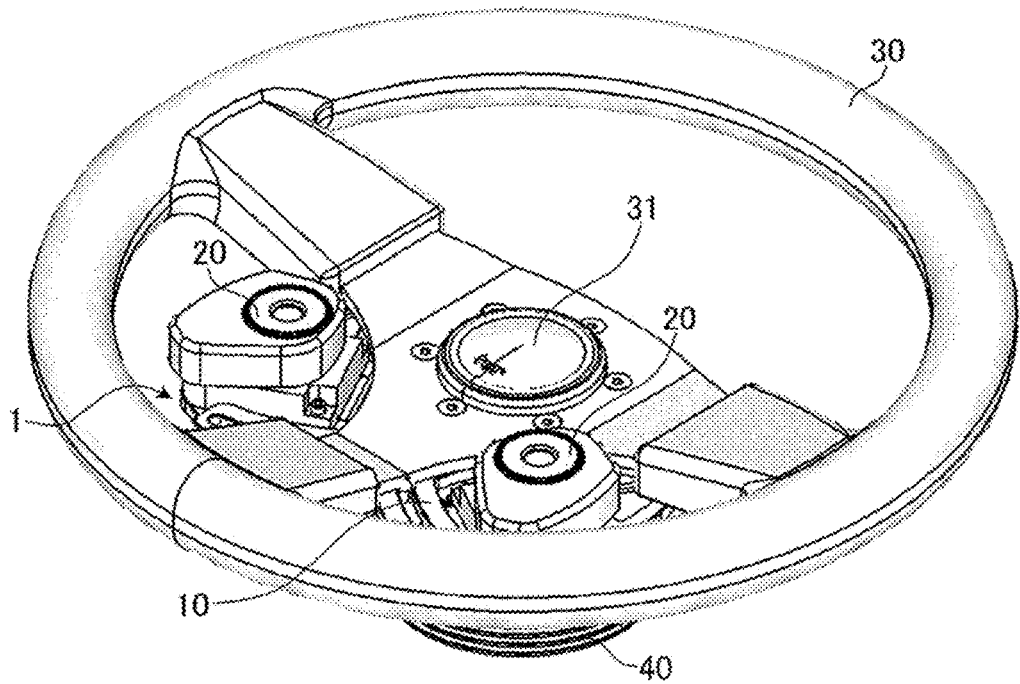
FIG. 2 is an exterior perspective view illustrating the state of using the switch attachment member according to the first embodiment.
Figure 3:
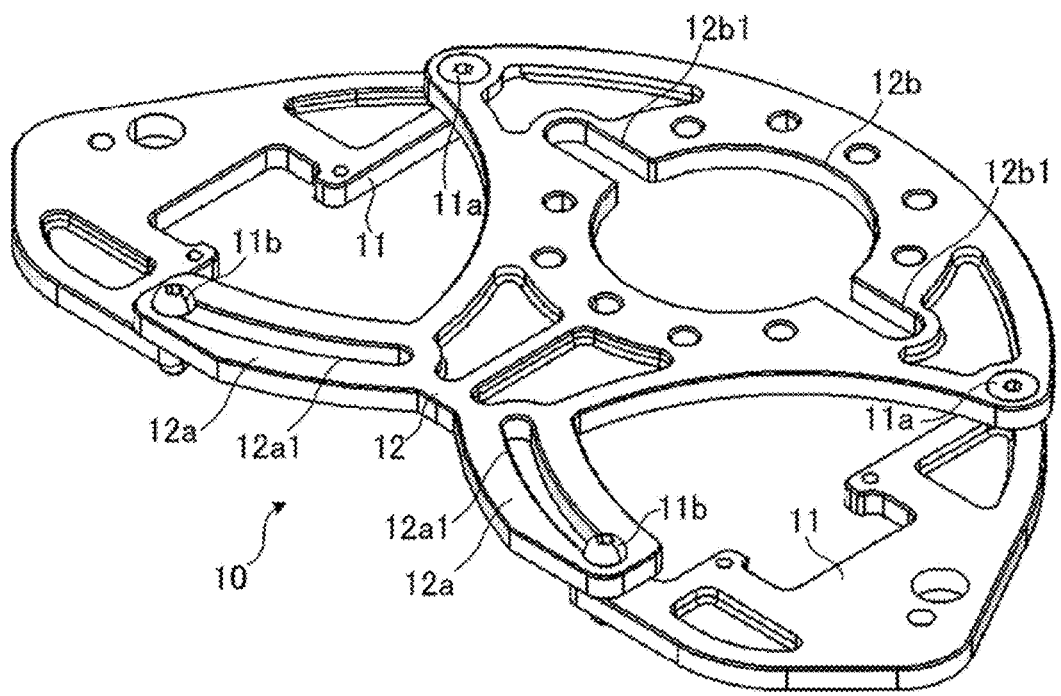
FIG. 3 is a perspective view illustrating the switch attachment member according to the first embodiment.

As illustrated in FIGS. 1 and 2, a switch attachment member 1 according to the first embodiment includes a support 10.

The support 10 is a member that supports two switches (switch parts) 20. The support 10 is formed to be attachable between a steering wheel 30 and a steering boss 40 and further is formed to be capable of changing positions of switches 20. The support 10 and the steering wheel 30 are integrally fixed to the steering boss 40 with a fixing member (not illustrated) such as a screw. An example of the steering wheel 30 includes a steering wheel having three spokes (refer to FIGS. 1 and 2).

The switches 20 are mounted on a genuine steering wheel (standard specification) of a vehicle or the like and receives an input operation performed by a user (for example, a driver, a mechanic, or the like). The switches 20 are detached from the genuine steering wheel, are individually attached to the support 10 with a fixing member (not illustrated) such as a screw, and further are connected to two respective sets of wiring 41 that elongate from the inside of the steering boss 40. The two sets of wiring 41 are individually pulled out from two elliptical holes (an example of the through-hole) 40a formed in a cover shoulder of the steering boss 40. Examples of the switch 20 include an operating switch of a stereo system, an air conditioner, a car navigation system, or the like or a switch group in which such switches are arranged.

Support

Next, the support 10 described above will be described in detail.

As illustrated in FIGS. 3 to 10 (mainly, FIGS. 3 to 5), the support 10 includes two support plates (first support plate) 11 and a support plate (second support plate) 12.

The two support plates 11 are members that individually support the switches 20. For example, the support plates 11 are formed to have a substantially triangular shape and are attached to a side of a back surface (bottom surface) of the support plate 12. End portions (first end portions) of the support plates 11 are individually attached to the back surface of the support plate 12 with respective support pins 11a, and the support plates 11 are formed to be rotatable with the support pins 11a as the rotation axes, respectively. In addition, an end portion (second end portion) of the support plate 11 on a side opposite to the first end portion is attached to the back surface of the support plate 12 with a fixing member 11b such as a screw and is formed to be fixable to the support plate 12. In other words, the first support plate 11 is rotatably provided on the second support plate 12 with the first end portion of the first support plate as a rotation center, and the second end portion on the side opposite to the first end portion is formed to be fixable to the second support plate 12. In this manner, the support plate 11 is slidably movable with respect to the support plate 12 and, further, is fixable at a desired position.

Figure 4:
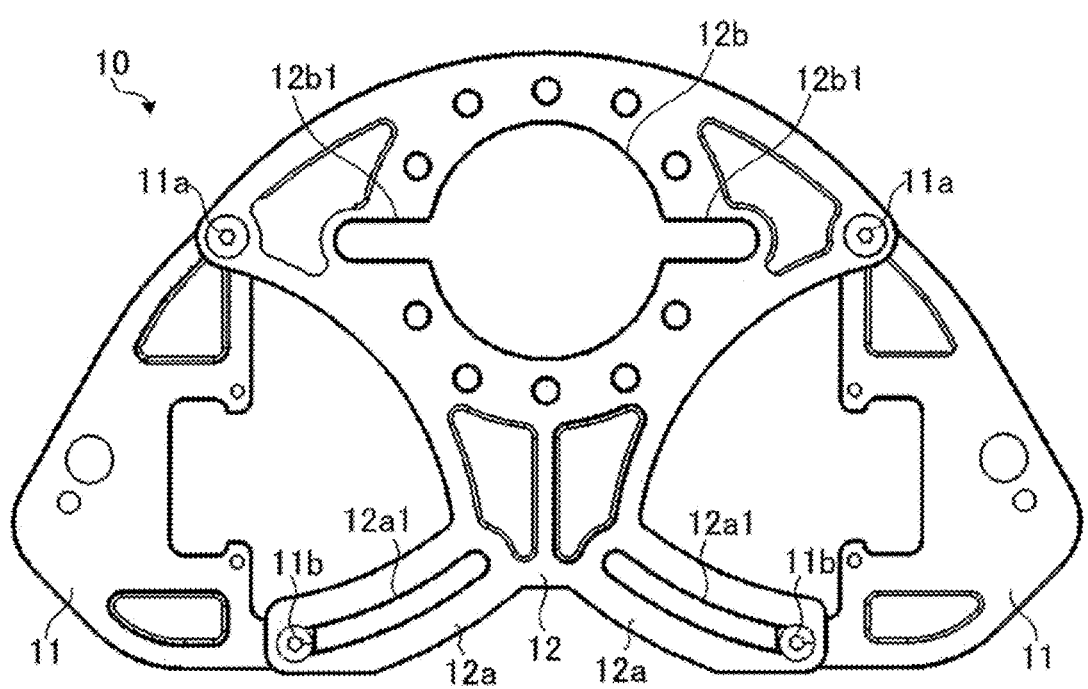
FIG. 4 is a plan view illustrating the switch attachment member in FIG. 3.
Figure 5:
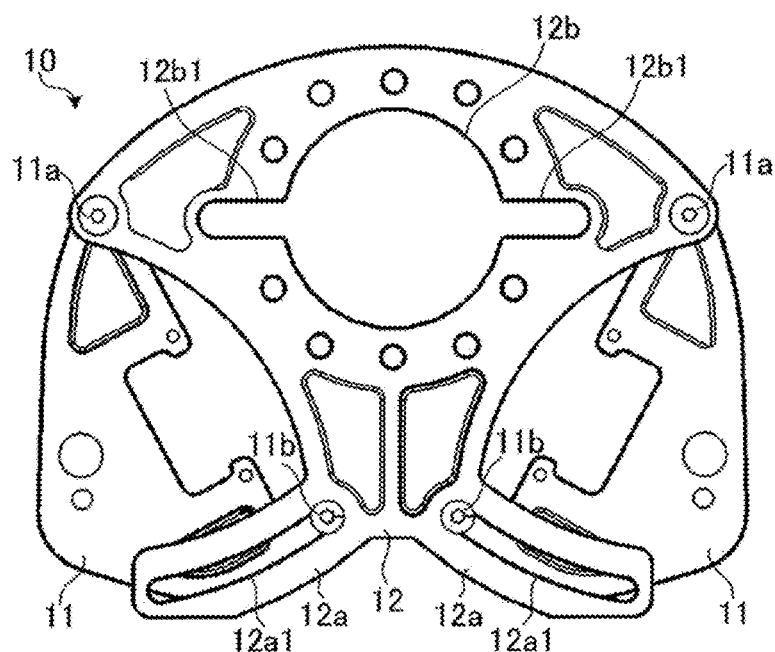
FIG. 5 is a plan view illustrating the switch attachment member in a state different from the state in FIG. 4.
Figure 6:
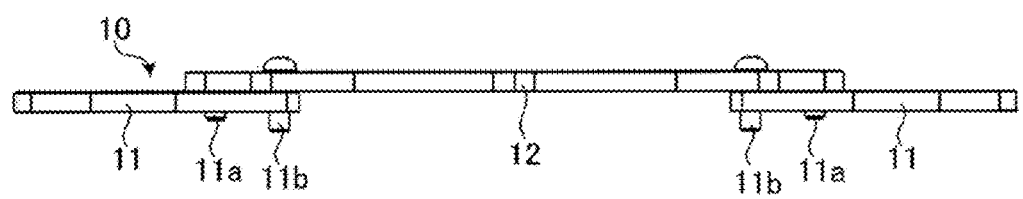
FIG. 6 is a front view illustrating the switch attachment member in FIG. 3.
Figure 7:
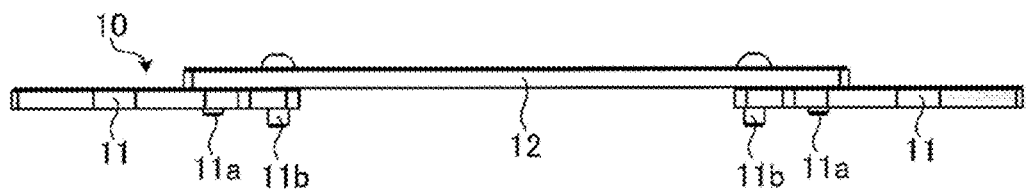
FIG. 7 is a rear view illustrating the switch attachment member in FIG. 3.
Figure 8:
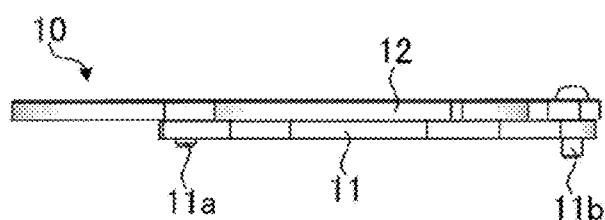
FIG. 8 is a left side view illustrating the switch attachment member in FIG. 3.
Figure 9:
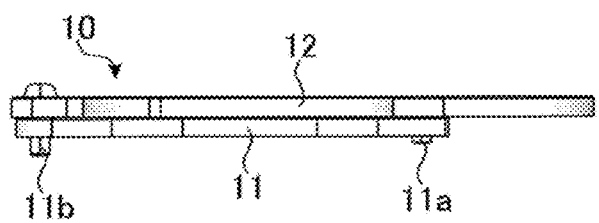
FIG. 9 is a right side view illustrating the switch attachment member in FIG. 3.
Figure 10:
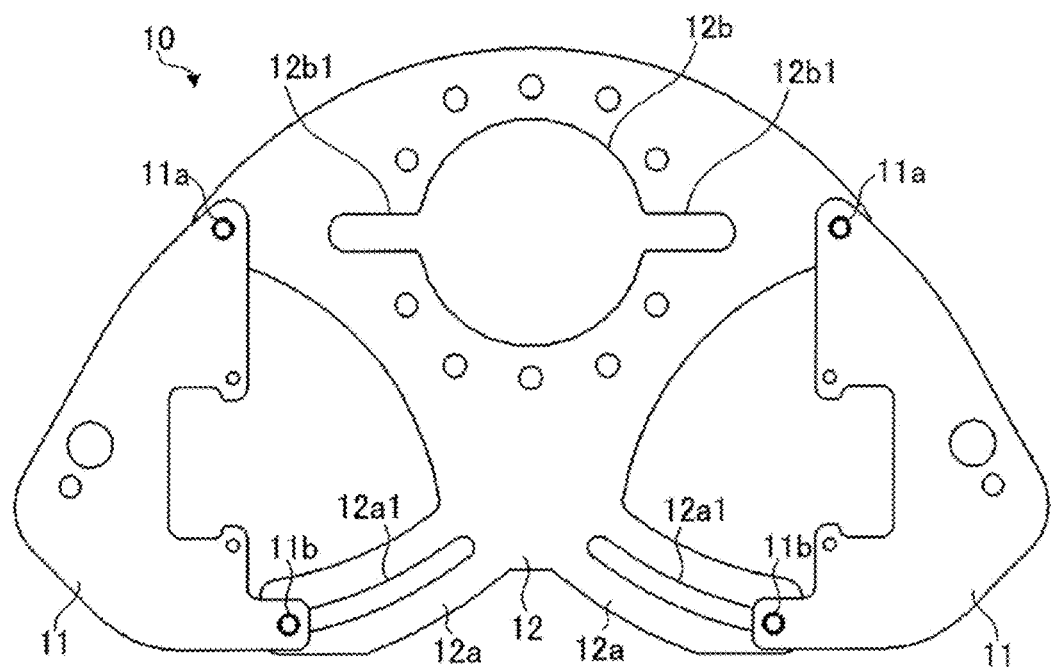
FIG. 10 is a bottom view illustrating the switch attachment member in FIG. 3.

The support plate 12 is a member that supports the two support plates 11 such that the two support plates are individually slidably movable. The support plate 12 is formed to have a shape that enables the switches 20 individually provided in the support plates 11 to move in association with the sliding movement of the support plates 11, that is, a shape that does not interfere with the movement of the switches 20. In FIG. 4, the support plate 12 is gradually constricted downward from a pair of pin positions to which the support pins 11a are individually attached (a width in a rightward-leftward direction in FIG. 4 is narrowed) and is formed to have a shape of projecting and extending in the rightward-leftward direction from a lower end portion of the constriction. Hence, the support plate 12 includes two extending portions 12a that individually extend from the lower end portion to the outer side in the rightward-leftward direction. As illustrated in FIG. 1, the support plate 12 is pinched by the steering wheel 30 and the steering boss 40 and further is formed to be attachable between the steering wheel 30 and the steering boss 40.

In addition, the support plate 12 is provided with two through-holes 12a1. The through-holes 12a1 are provided in the respective elongated portions 12a and are formed to have a curved shape stretching by a predetermined distance (for example, about several centimeters to dozens of centimeters) on a circumference with the support pins 11a as the centers. The fixing member lib is inserted into the through-hole 12a1 and is attached to a screw hole in the second end portion of the support plate 11. The support plates 11 are fixed to the support plate 12 by fastening of the fixing members 11b. On the other hand, when the fastening of the fixing member 11b is loosened, the support plate 11 is slidably movable with respect to the support plate 12 with the support pin 11a as the rotation axis. In this way, the support plate 11 is slidably movable within a range of the predetermined distance described above and is fixable to the support plate 12 at a desired position (refer to FIGS. 4 and 5).

In addition, the support plate 12 is provided with a 5J through-hole 12b and two through-holes 12b1 that are connected to the through-hole 12b. The through-hole 12b is a hole into which a back-surface projecting portion 31a of horn button 31 mounted at the central portion of the steering wheel 30 is inserted. The two through-holes 12b1 are each notch portions of the through-hole 12b and are formed at positions which are opposite to each other with the through-hole 12b therebetween.

(Mounting Process of Switch Attachment Member)

Next, the flow of a mounting process of the switch attachment member 1 described above will be described.

As illustrated in FIG. 1, two switches 20 are attached to two support plates 11 in the support 10 of the switch attachment member 1 with a fixing member (not illustrated) such as a screw. The support 10, to which the switches 20 are attached, is positioned with respect to the steering boss 40. The two sets of wiring 41 elongating from the steering boss 40 pass through the respective elliptical holes 40a of the steering boss 40 and is connected to the respective switches 20 (for detail, terminals of the switches 20) attached to the two support plates 11.

The steer steering wheel 30 is positioned with respect to the steering boss 40 via the support 10 and is fixed to the steering boss 40 along with the support 10 with the fixing member (not illustrated) such as a screw. At this time, the support plates 11 of the support 10 are operated by a user such that the switches 20 on the support plates 11 are positioned between the spokes, that is, in the steering wheel 30, without hitting the spokes of the steering wheel 30. Depending on the operation, the support plates 11 slidably move with respect to the support plate 12 with the respective support pins 11a (refer to FIGS. 3, 4, 5, or the like) as the rotation axis (for example, move in a direction in which the support plates 11 approach each other or a direction in which the support plates are separated from each other). As described above, when the positions of the support plates 11 are adjusted, and the positions of the switches 20 are determined, the support plates 11 are fixed at a desired position by the fastening of the fixing members lib (refer to FIGS. 3, 4, 5, or the like).

As illustrated in FIGS. 1 and 2, by the mounting process, the support 10 of the switch attachment member 1 is mounted between the steering wheel 30 and the steering boss 40. At this time, the switches 20 on the support 10 are present at positions in the steering wheel 30 (positions between the three spokes), and thus the user can operate the switches 20 in the same manner as those on the genuine steering wheel. Hence, since the switches 20 mounted in the genuine steering wheel can be detached, and the detached switches 20 can be provided at desired positions at which an operation can be performed, it is possible to realize a reuse of the switches 20 and to improve user convenience. Additionally, since it is possible to adjust the positions of the switches 20, it is possible to change the positions of the switches 20 depending on user preferences such as an easy operation by the user, thus it is possible to further improve the user convenience.

Here, the genuine steering wheel is replaced with another steering wheel 30 other than the genuine steering wheel as necessary for user preferences or the like; however, a various numbers of such as three or four spokes of the steering wheel 30 are provided, and it is important that the switches 20 be disposed at desired positions such as positions between the spokes when the switches 20 are attached and operability or the like is considered. Hence, it is possible to dispose the switches 20 at positions between the spokes by using the switch attachment member 1 described above, and it is possible to reliably improve the user convenience because it is possible to adjust the positions of the switches 20.

As described above, according to the first embodiment, the support 10 that supports the switches 20 is attachable between the steering wheel 30 and the steering boss 40, and is formed to be capable of changing the positions of the switches 20. In this manner, since the switches 20 mounted in the genuine steering wheel can be detached and can be provided at the desired positions at which the operation can be performed, it is possible to realize the reuse of the switches 20 and to improve the user convenience. Additionally, since it is possible to adjust the positions of the switches 20, it is possible to change the positions of the switches 20 depending on user preferences, and it is possible to further improve user convenience.

In addition, the support 10 is configured to include the pair of support plates 11 that individually supports the switches 20 and the support plate 12 that is formed to be attachable between the steering wheel 30 and the steering boss 40, and supports the pair of support plates 11 in a slidably movable manner. In addition, the first support plate 11 is rotatably provided on the second support plate 12 with the first end portion of the first support plate as a rotation center, and the second end portion on a side opposite to the first end portion is formed to be fixable to the second support plate 12. By using such simple configuration, it is possible to improve the user convenience while reducing costs.

Second Embodiment

A second embodiment will be described with reference to FIG. 11. In the second embodiment, a difference (a quick release member) from the first embodiment is described with reference to the figures in addition to FIG. 11 as necessary, and the other description is omitted.

Figure 11:
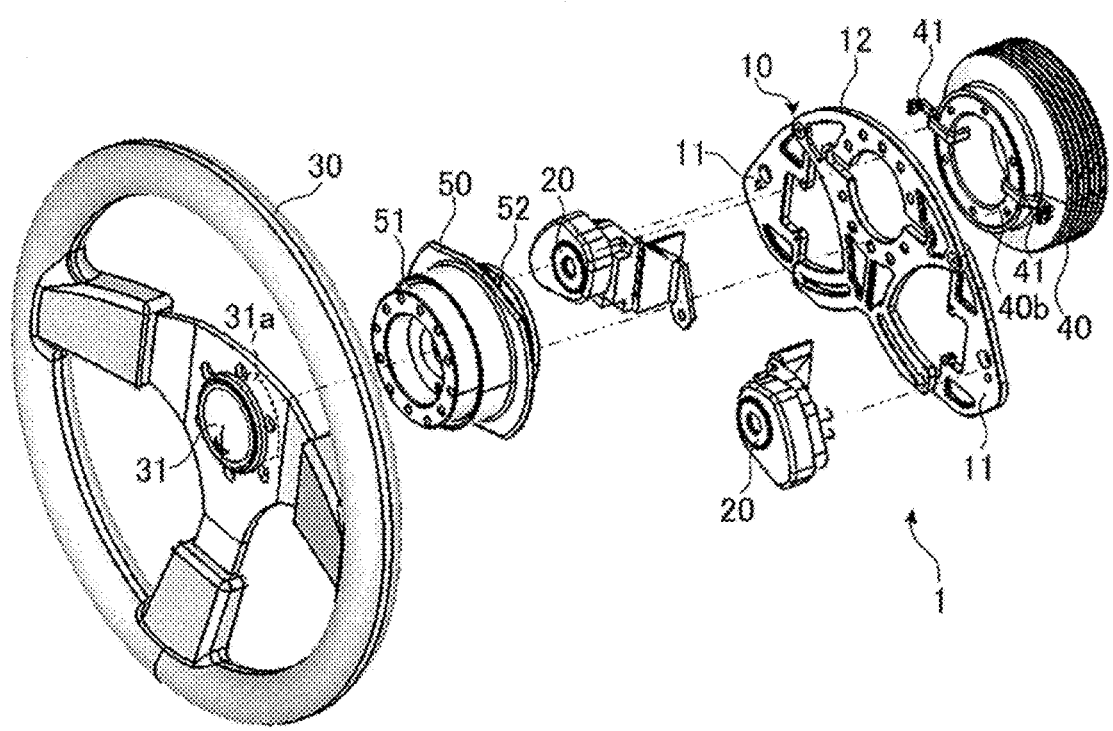
FIG. 11 is an exploded perspective view illustrating a state of using a switch attachment member according to a second embodiment.

As illustrated in FIG. 11, the switch attachment member 1 according to the second embodiment basically has the same configuration as that of the first embodiment. The support 10 of the switch attachment member 1 is formed to be attachable between a quick release member 50 and the steering boss 40. The quick release member 50 is formed to be attachable between the steering wheel 30 and the steering boss 40, and further to be capable of attaching and detaching the steering wheel 30 to and from the steering boss 40 in a one-touch operation. The user can attach and detach the steering wheel 30 to and from the steering boss 40 by only operating the quick release member 50 without removing the fixing member (not illustrated) such as the screw. The steering boss 40 is a boss referred to as a short boss having a short length (low height) compared to the first embodiment.

The quick release member 50 includes a wheel attachment member 51 and a boss attachment member 52. The wheel attachment member 51 is attached to the steering wheel 30 with a fixing member (not illustrated) such as a screw. In addition, the boss attachment member 52 is attached to the steering boss 40 with a fixing member (not illustrated) such as a screw via the support 10. The wheel attachment member 51 and the boss attachment member 52 are formed to be attachable and detachable in a one-touch operation through the operation performed by the user. It is possible to use various types of mechanisms as such an attaching/detaching mechanism; however, a mechanism that can perform the attachment and detachment in the one-touch operation is used, without removing the fixing member such as the screw by the user.

The two through-holes 12b1 (refer to FIGS. 3, 4, or the like) in the support 10 are formed as the respective notch portions of the through-hole 12b in the support 10. The sets of wiring 41 (refer to FIG. 11) pulled from the center hole 40b of the steering boss 40 are individually inserted into the through-holes 12b1, and the sets of wiring 41 pass through the two respective through-holes 12b1. Even in a state in which the boss attachment member 52 is attached to the steering boss 40 via the support 10, the through-hole 12b1 is formed such that a region having a predetermined size (a size of allowing the wiring 41 to pass through) on the outer side of the opening of the through-hole 12b1 is not blocked by the boss attachment member 52.

(Mounting Process of Switch Attachment Member)

Next, the flow of a mounting process of the switch attachment member 1 described above will be described.

As illustrated in FIG. 11, two switches 20 are attached to two support plates 11 in the support 10 of the switch attachment member 1 with a fixing member (not illustrated) such as a screw. The support 10, to which the switches 20 are attached, is positioned with respect to the steering boss 40. The two sets of wiring 41 elongating from the steering boss 40 pass through the respective through-holes 12b1 (refer to FIGS. 3, 4, or the like) of the support plate 12 of the support 10 and is connected to the respective switches 20 (for detail, terminals of the switches 20) attached to the two support plates 11.

The wheel attachment member 51 of the quick release member 50 is attached to the steering wheel 30 with a fixing member (not illustrated) such as a screw. In addition, the boss attachment member 52 of the quick release member 50 is positioned with respect to the steering boss 40 via the support 10 and is fixed to the steering boss 40 along with the support 10 with the fixing member (not illustrated) such as a screw. The wheel attachment member 51 fixed to the steering wheel 30 is attached to the boss attachment member 52 in the one-touch operation.

At this time, the support plates 11 of the support 10 are operated by a user such that the switches 20 on the support plates 11 are positioned between the spokes, that is, in the steering wheel 30, without hitting the spokes of the steering wheel 30 and the quick release member 50. Depending on the operation, the support plates 11 slidably move with respect to the support plate 12 with the respective support pins 11a (refer to FIG. 3, 4, or 5) as the rotation axis (for example, move in a direction in which the support plates 11 approach each other or a direction in which the support plates are separated from each other). As described above, when the positions of the support plates 11 are adjusted, and the positions of the switches 20 are determined, the support plates 11 are fixed at a desired position by the fastening of the fixing members 11b (refer to FIGS. 3, 4, 5, or the like).

As illustrated in FIG. 11, by the mounting process, the support 10 of the switch attachment member 1 is mounted between the quick release member 50 and the steering boss 40. At this time, the switches 20 on the support 10 avoid the quick release member 50 and are present at positions in the steering wheel 30 (positions between the three spokes), and thus the user can operate the switches 20 in the same manner as those on the genuine steering wheel. Hence, even in a case of using the quick release member 50 which is an obstacle to the installation of the switches 20, it is possible to adjust the positions of the switches 20. Therefore, the switches 20 mounted in the genuine steering wheel can be detached, and the detached switches 20 can be provided at desired positions at which an operation can be performed. In this manner, it is possible to realize the reuse of the switches 20, and it is possible to improve the user convenience. Additionally, since it is possible to adjust the positions of the switches 20, it is possible to change the positions of the switches 20 depending on user preferences such as an easy operation by the user, and it is possible to further improve the user convenience.

As described above, according to the second embodiment, it is possible to achieve the same effects as those in the first embodiment. In other words, even in a case of using the quick release member 50 which is an obstacle to the installation of the switches 20, it is possible to adjust the positions of the switches 20, similar to the first embodiment, and it is possible to improve the user convenience.

In addition, the support plate 12 is provided with the through-holes 12b1 through which the wiring 41 connected to the switches 20 passes. In this manner, since the wiring 41 is connected to the switches 20 through the through-holes 12b1 and a layout route of the wiring 41 extending to the switches 20 is determined, it is possible to secure a design quality, compared to a case where the wiring 41 is freely pulled around, and it is possible to further reduce damage to the wiring 41 due to the slidable movement of the support plates 11, or the like.

OTHER EMBODIMENTS

In the above description, the shapes of the support 10, that is, the support plates 11 or the support plate 12 is exemplified; however, the shape is not limited thereto, and there is no limitation to the shapes. However, when the shape of the steering wheel 30 or the switches 20, positional adjustment of the switches 20, or the like is considered, it is preferable to employ the shape illustrated in FIGS. 3, 4, or the like as described above.

In addition, in the above description, the mechanism of the slidable movement of the support plates 11 is exemplified; however, the mechanism is not limited thereto, and there is no limitation to the mechanism. However, when the shape of the steering wheel 30 or the switches 20, the positional adjustment of the switches 20, or the like is considered, it is preferable to employ the mechanism illustrated in FIGS. 3, 4, or the like as described above. Additionally, movement other than the slidable movement may be applied, and it is possible to use various types of mechanisms for the movement.

In addition, in the above description, the number of switches (switch portions) 20 is exemplified as two; however, the number is not limited thereto, for example the number may be one or three, and there is no limitation to the number. In a case of using one switch 20, one support plate 11 may be used, and thus it is also possible to change the shape of the support plate 12 in association with the number.

The support plate 11 is provided with the notch portion (an example of a through-hole) by which the support plates 11 in a state in which the switches 20 are attached does not block the terminals of the switches 20 on the back surface thereof, that is by which the terminals are exposed (refer to FIGS. 1, 3, 4, or the like), the configuration is not limited thereto. For example, in a case or the like where the terminals are present on the side surface of the switches 20, the notch portions may not be formed in the support plate 11. In addition, when the support plates 11 are attached to the support plate 12, through-holes are formed by the support plates 11 and the support plate 12 (refer to FIGS. 1, 3, 4, or the like). The through-hole is connected to the notch portion described above and functions as an insertion hole into which a part (projecting portion) of the switch 20 is inserted. The size of the through-hole is changed in association with the slidable movement of the support plate 11.

The invention is not limited to the embodiments described above, and it is possible to modify the invention in various manners within a range without departing from a gist thereof. For example, several constituent elements may be removed from the entire constituent elements in the embodiments described above. Further, constituent elements described in different embodiments may be appropriately combined.

What is claimed is:

1. A switch attachment member comprising a support that is formed to be attachable between a steering wheel and a steering boss, and supports a switch, wherein
   the support is formed to allow the switch to move,
   the support includes
      a first support plate that supports the switch, and
      a second support plate that is formed to be attachable between the steering wheel and the steering boss, and supports the first support plate in a movable manner,
   the first support plate is rotatably provided on the second support plate with a first end portion of the first support plate as a rotation center, and a second end portion on a side opposite to the first end portion is formed to be fixable to the second support plate,
   the first support plate is formed to have a triangular shape,
   the first end portion is a portion of one of three vertexes of the first support plate, and
   the second end portion is a portion of another one of the three vertexes.

2. A switch attachment member comprising a support that is formed to be attachable between a steering wheel and a steering boss, and supports a switch, wherein
   the support is formed to allow the switch to move,
   the support includes
      a first support plate that supports the switch, and
      a second support plate that is formed to be attachable between the steering wheel and the steering boss, and supports the first support plate in a movable manner,
   the second support plate is provided with a through-hole through which wiring connected to the switch passes,
   the second support plate is provided with a through-hole in which a portion of the steering wheel is fitted, and
   the through-hole through which the wiring passes is a notch portion that is connected to the through-hole in which the portion of the steering wheel is fitted.

3. A switch attachment member comprising a support that is formed to be attachable between a steering wheel and a steering boss, and supports two switches, wherein
   the support is formed to allow the switches to move toward and away from each other, and
   the support includes
      a first support plate that supports one of the switches,
      a third support plate that supports another of the switches, and
      a second support plate that is formed to be attachable between the steering wheel and the steering boss, and supports the first support plate and the third support plate in a movable manner.

4. The switch attachment member according to claim 3, wherein the first support plate is rotatably provided on the second support plate with a first end portion of the first support plate as a rotation center, and a second end portion on a side opposite to the first end portion is formed to be fixable to the second support plate, and
   the third support plate is rotatably provided on the second support plate with a first end portion of the third support plate as a rotation center, and a second end portion on a side opposite to the first end portion is formed to be fixable to the second support plate.

5. The switch attachment member according to claim 4, wherein the first support plate is formed to have a triangular shape,
   the first end portion of the first support plate is a portion of one of three vertexes of the first support plate,
   the second end portion of the first support plate is a portion of another one of the three vertexes,
   the second support plate is formed to have a triangular shape, the first end portion of the second support plate is a portion of one of three vertexes of the second support plate, and the second end portion of the second support plate is a portion of another one of the three vertexes.

6. A switch attachment member comprising a support that is formed to be attachable between a steering wheel and a steering boss, and supports two switches, wherein the support is formed to allow the switches to move toward and away from each other, and the support includes a first plate that supports one of the switches, and a second support plate that is formed to be attachable between the steering wheel and the steering boss, the second support plate is provided with a through-hole through which wiring connected to one of the switches passes and a through-hole through which wiring connected to another of the switches passes.

7. The switch attachment member according to claim 6, wherein the second support plate is provided with a through-hole in which a portion of the steering wheel is fitted, and each of the two through-holes through which the wirings pass is a notch portion that is connected to the through-hole in which the portion of the steering wheel is fitted.

\* \* \* \* \*